(12) United States Patent
Wang et al.

(10) Patent No.: US 11,411,865 B2
(45) Date of Patent: Aug. 9, 2022

(54) NETWORK RESOURCE SCHEDULING METHOD, APPARATUS, ELECTRONIC DEVICE AND STORAGE MEDIUM

(71) Applicant: Beijing University of Posts and Telecommunications, Beijing (CN)

(72) Inventors: Jing Wang, Beijing (CN); Jingyu Wang, Beijing (CN); Haifeng Sun, Beijing (CN); Qi Qi, Beijing (CN); Bo He, Beijing (CN); Jianxin Liao, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 154 days.

(21) Appl. No.: 16/906,867

(22) Filed: Jun. 19, 2020

(65) Prior Publication Data
US 2020/0403913 A1 Dec. 24, 2020

(51) Int. Cl.
*H04L 45/00* (2022.01)
*H04L 45/302* (2022.01)

(52) U.S. Cl.
CPC .......... *H04L 45/38* (2013.01); *H04L 45/306* (2013.01); *H04L 45/70* (2013.01)

(58) Field of Classification Search
CPC ........ H04L 45/38; H04L 45/70; H04L 45/306
See application file for complete search history.

(56) References Cited

U.S. PATENT DOCUMENTS

2003/0091031 A1* 5/2003 Kuhlmann .......... H04L 12/1485
                                                    370/352
2008/0037477 A1* 2/2008 Axelsson ................ H04L 45/02
                                                    370/338

(Continued)

FOREIGN PATENT DOCUMENTS

CN         107104826 A      8/2017
CN         108900419 A     11/2018
CN         109144673 A      1/2019

OTHER PUBLICATIONS

Liu, Huaping et al., "Extreme Trust Region Policy Optimization for Active Object Recognition", IEEE Transactions on Neural Networks and Learning Systems, 2162-237X © 2018, 6 pages.

(Continued)

*Primary Examiner* — Jung H Park
*Assistant Examiner* — Sumitra Ganguly
(74) *Attorney, Agent, or Firm* — Suiter Swantz pc llo

(57) ABSTRACT

A network resource scheduling method, apparatus, an electronic device and a storage medium are disclosed. An embodiment of the method includes: upon receipt of a network data stream, determining a traffic type of the network data stream based on the number of data packets of the network data stream received within a specified period of time, lengths of the data packets and reception times of the data packets; for each data packet comprised in the network data stream, determining a target transmission path for the data packet, based on node state parameters of nodes in the network cluster, link state parameters of links in the network cluster, and the traffic type of the network data stream when (Continued)

upon receipt of a network data stream, determining a traffic type of the network data stream based on the number of data packets of the network data stream received within a specified period of time, lengths of the data packets and reception times of the data packets — S101 for each data packet comprised in the network data stream, determining a target transmission path for the data packet, based on node state parameters of nodes in the network cluster, link state parameters of links in the network cluster, and the traffic type of the network data stream when the data packet is received — S102 transmitting the data packet via the target transmission path — S103 the data packet is received; and transmitting the data packet via the target transmission path.

10 Claims, 2 Drawing Sheets

(56) References Cited

U.S. PATENT DOCUMENTS

| | | | | |
|---|---|---|---|---|
| 2008/0232375 | A1* | 9/2008 | Hachiya | H04L 45/02 |
| | | | | 370/392 |
| 2016/0285737 | A1* | 9/2016 | Higuchi | H04L 45/42 |
| 2018/0324093 | A1* | 11/2018 | Namjoshi | H04L 41/0866 |
| 2019/0073224 | A1 | 3/2019 | Tian et al. | |
| 2019/0140904 | A1* | 5/2019 | Huang | H04L 41/0816 |
| 2020/0014619 | A1* | 1/2020 | Shelar | H04L 45/14 |

OTHER PUBLICATIONS

Schulman, John et al., "Trust Region Policy Optimization", distriarXiv:1502.05477v5 [cs.LG] Apr. 20, 2017, 16 pages.

* cited by examiner

NETWORK RESOURCE SCHEDULING METHOD, APPARATUS, ELECTRONIC DEVICE AND STORAGE MEDIUM

The present application claims priority to Chinese patent application No. 201910543654.1, filed with the China National Intellectual Property Administration on Jun. 21, 2019 and entitled "Network Function Virtualization Intelligent Scheduling Method Based on Traffic Identification", which is incorporated herein by reference in its entirety.

TECHNICAL FIELD

The present invention relates to communication technologies, and more particular, to a network resource scheduling method, apparatus, an electronic device and a storage medium.

BACKGROUND

As network traffic has increased and network applications have been widely used, users of the network are requiring a higher quality of service. The quality of service requirements may include low transmission latency, low packet loss rate, high throughput, etc. To satisfy the requirements of the users, not only an increase in bandwidth and capacity but also an appropriate resource scheduling mechanism has been desirable for network devices.

Network Function Virtualization (NFV) is a technique that may separate network functions from traditional hardware devices, and can implement network functions in a flexible way arranged and share network resources. NFV may use Virtualized Network Functions (VNF) to create, configure, monitor and operate different networks. In a content distribution network that includes multiple network nodes, VNFs are deployed in different network nodes, and network services are realized by a service function chain composed of certain VNFs. Therefore, when the NFV technique is used, VNFs are arranged and scheduled to provide a service function chain for network services, which can improve the quality of services of the network.

However, existing scheduling solutions follow the first-in first-out principle, with a goal of improving network utilization, to complete transmission of as much network traffic as possible. That is, data streams are processed in the order in which the data streams are received. The data stream received first will be handled first, and the data stream received next will handled later. However, different types of data streams require different quality of services. In the first-in first-out solutions, the data stream with a lower priority may occupy a large amount of network resources, which may result in a high delay of the data stream having a higher priority and a poor performance of network services.

SUMMARY

The objective of embodiments of the present application is to provide a network resource scheduling method, apparatus, an electronic device and a storage medium, to improve the performance of network services.

In a first aspect, an embodiment of the present application provides a network resource scheduling method. The method is applicable to an ingress node in a network cluster, and includes:

upon receipt of a network data stream, determining a traffic type of the network data stream based on the number of data packets of the network data stream received within a specified period of time, lengths of the data packets and reception times of the data packets;

for each data packet included in the network data stream, determining a target transmission path for the data packet, based on node state parameters of nodes in the network cluster, link state parameters of links in the network cluster, and the traffic type of the network data stream when the data packet is received; and transmitting the data packet via the target transmission path.

In an embodiment, the determining of a target transmission path for the data packet includes:

when the data packet is received, collecting the node state parameters of the nodes in the network cluster, wherein a node state parameter of a node represents an idle computing resource of the node;

collecting the link state parameters of the links in the network cluster, wherein a link state parameter of a link represents an idle bandwidth resource of the link;

determining transmission state parameters of the data packet based on the traffic type of the network data stream, a preset correspondence between traffic types and maximum transmission times, and a preset correspondence between the traffic types and transmission priorities; wherein the transmission state parameters include a maximum transmission time and a transmission priority of the data packet; and inputting the node state parameters, the link state parameters and the transmission state parameters into a network scheduling model to obtain the target transmission path output from the network scheduling model.

In an embodiment, the network scheduling model is obtained through operations including:

setting a state space for a Trust Region Policy Optimization (TRPO) algorithm:

$$S^{t_i} = \{S_N^{t_i}, S_E^{t_i}, S_P^{t_i}\} = \{C_1^{t_i}, \ldots, C_n^{t_i}, b_1^{t_i}, \ldots, b_n^{t_i}, MTT_i, TP_i\};$$

wherein $S^{t_i}$ is a network state at a time step $t_i$, and $S^{t_i}$ is composed of $S_N^{t_i}$, $S_E^{t_i}$ and $S_P^{t_i}$; and the time step $t_i$ is a time step at which the network scheduling model performs network resource scheduling for a data packet i;

wherein $S_N^{t_i}$ is the node state parameters of the nodes in the network cluster, and $S_N^{t_i}$ includes $C_1^{t_i}, \ldots, C_N^{t_i}$, where $C_N^{t_i}$ represents an idle computing resource of a node n at the time step $t_i$;

wherein $S_E^{t_i}$ is the link state parameters of the links in the network cluster, and $S_E^{t_i}$ includes $b_1^{t_i}, \ldots, b_N^{t_i}$, where $b_N^{t_i}$ represents an idle bandwidth resource of a link n at the time step $t_i$; and wherein $S_P^{t_i}$ includes $MTT_i$ and $TP_i$; $MTT_i$ represents a maximum transmission time of the data packet i, and the maximum transmission time of the data packet i is a maximum transmission time corresponding to the traffic type of the network data stream to which the data packet i belongs; and $TP_i$ represents a transmission priority of the data packet i, and the transmission priority of the data packet i is a transmission priority corresponding to the traffic type of the network data stream to which the data packet i belongs;

traversing the network cluster to determine transmission paths from the ingress node to an egress node in the network cluster, and setting an action space for the TRPO algorithm based on the determined transmission paths: $A = \{a|a \in \{1, 2, \ldots, P\}\}$, wherein a represents an action selected according to the TRPO algorithm, and P represents the number of the transmission paths from the ingress node to the egress node in the network cluster;

setting a reward function for the TRPO algorithm:

$$r_t = -\sum_{i \in I_t} \frac{1}{MTT_i} - cN_t + b;$$

wherein $r_t$ is the reward function at the time step t, $I_t$ is a set of data packets transmitted over the network cluster within the time step t, $N_t$ is the number of data packets discarded within the time step t, b is a baseline value, and c is a penalty coefficient;

setting a loss function for the TRPO algorithm:

$$L(\theta) = E_t[\text{clip}(r_t(\theta), 1-\varepsilon, 1+\varepsilon)\hat{A}_t - \lambda D_{pp}(\pi_{\theta_{old}}(\cdot | s), \pi_\theta(\cdot | s))];$$

wherein $$E_t[\text{clip}(r_t(\theta), 1-\varepsilon, 1+\varepsilon)\hat{A}_t - \lambda D_{pp}(\pi_{\theta_{old}}(\cdot | s), \pi_\theta(\cdot | s))]$$

represents a mathematical expectation of $$\text{clip}(r_t(\theta), 1-\varepsilon, 1+\varepsilon)\hat{A}_t - \lambda D_{pp}(\pi_{\theta_{old}}(\cdot | s), \pi_\theta(\cdot | s))$$

at the time step t, θ represents a set of all parameters of a neural network for a policy in the TRPO algorithm, and $$r_t(\theta) = \frac{\pi_\theta(a_t | s_t)}{\pi_{\theta_{old}}(a_t | s_t)}$$

represents a ratio of a probability that an action is selected under a new policy in a network state to a probability that the same action is selected under an old policy in the same network state;

wherein the function clip( ) is a value clipping function; 1+ε(ε∈(0,1)) in the function clip( ) is an upper bound value of $r_t(\theta)$, and 1−ε(ε∈(0,1)) is a lower bound value of $r_t(\theta)$; if a calculated value of $r_t(\theta)$ is between the upper bound value and the lower bound value, a value of the function clip( ) is the calculated value of $r_t(\theta)$; if the calculated value of $r_t(\theta)$ is greater than the upper bound value, the value of the function clip( ) is the upper bound value; and if the calculated value of $r_t(\theta)$ is less than the lower bound value, the value of the function clip( ) is the lower bound value;

wherein $$D_{pp}(\pi_{\theta_{old}}(\cdot | s), \pi_\theta(\cdot | s)) = (\pi_{\theta_{old}}(a_t | s_t) - \pi_\theta(a_t | s_t))^2$$

represents a square value of a distance of a point probability distribution between the new policy $\pi_\theta(a_t|s_t)$ and the old policy $$\pi_{\theta_{old}}(a_t | s_t),$$

and λ is a penalty coefficient;
wherein $\hat{A}_t$ is an advantage function, $\hat{A}_t$ represents a difference between an action value function for selecting a specific action at the time step t and a state value function at the time step t, $$\hat{A}_t = A(s, a) = E_\pi\left[\sum_{k=0}^{\infty} \gamma^k r_{t+k} \middle| S_t = s, A_t = a\right] - V_t(s);$$

wherein $$E_\pi\left[\sum_{k=0}^{\infty} \gamma^k r_{t+k} \middle| S_t = s, A_t = a\right]$$

represents the action value function for taking an action a under a state s according to a policy $$\pi, \sum_{k=0}^{\infty} \gamma^k r_{t+k}$$

is a predicted cumulated reward value in K time steps after taking the action a at the time step t, $E_\pi[\ ]$ is used to compute an expectation; γ(γ∈(0,1)) is a discount factor indicating importance of future rewards relative to current rewards; $r_{t+k}$ represents a reward value at a time step t+k; $V_t(s)$ represents a weighted sum of action value functions of all actions in the action space under the network state s at the time step t; and training the neural network model by using network data stream samples, the state space, the action space, the reward function and the loss function to obtain the network scheduling model, wherein the neural network model is a neural network model based on the TRPO algorithm.

In an embodiment, the determining of a traffic type of the network data stream includes:

determining features of the network data stream based on the number of the data packets of the network data stream received within the specified period of time, the lengths of the data packets and the reception times of the data packets; and inputting the features into a preset classification model to obtain a result of classification of the network data stream from the preset classification model, wherein the preset classification model is obtained by training with a preset training set, wherein the preset training set includes network data stream samples and traffic types of the network data stream samples;

wherein the features include:

within the specified period of time, a maximum value of arrival time intervals of received forward packets of the network data stream, a minimum value of the arrival time intervals of the forward packets, an average value of the arrival time intervals of the forward packets, a standard deviation of the arrival time intervals of the forward packets, a maximum value of lengths of the forward packets, a minimum value of the lengths of the forward packets, an average value of the lengths of the forward packets, and a standard deviation of the lengths of the forward packets;

within the specified period of time, a maximum value of arrival time intervals of received backward packets of the network data stream, a minimum value of the arrival time intervals of the backward packets, an average value of the arrival time intervals of the backward packets, a standard deviation of the arrival time intervals of the backward packets, a maximum value of lengths of the backward packets, a minimum value of the lengths of the backward packets, an average value of the lengths of the backward packets, and a standard deviation of the lengths of the backward packets;

within the specified period of time, a maximum value of arrival time intervals of received bidirectional packets of the network data stream, a minimum value of the arrival time intervals of the bidirectional packets, an average value of the arrival time intervals of the bidirectional packets, a standard deviation of the arrival time intervals of the bidirectional packets, a maximum value of lengths of the bidirectional packets, a minimum value of the lengths of the bidirectional packets, an average value of the lengths of the bidirectional packets, and a standard deviation of the lengths of the bidirectional packets;

duration of the network data stream within the specified period of time, wherein the duration of the network data stream refers to a difference between a reception time of a first data packet and a reception time of a last data packet within the specified period of time; and within the specified period of time, the number of the received forward packets of the network data stream per second, the number of bytes of the forward packets per second, the number of the received backward packets of the network data stream per second, the number of bytes of the backward packets per second, a ratio of the number of the forward packets per second to the number of the backward packets per second, and a ratio of the number of the bytes of the forward packets per second to the number of the bytes of the backward packets per second.

In an embodiment, after determining the traffic type of the network data stream, the method further includes:

re-determining, every specified time interval, the traffic type of the network data stream based on the number of data packets of the network data stream received within the specified period of time, the lengths of the data packets and the reception times of the data packets.

In a second aspect, an embodiment of the present application provides a network resource scheduling apparatus. The apparatus is applicable to the ingress node in a network cluster, and includes:

a determination module, configured for upon receipt of a network data stream, determining a traffic type of the network data stream based on the number of data packets of the network data stream received within a specified period of time, lengths of the data packets and reception times of the data packets; and for each data packet included in the network data stream, determining a target transmission path for the data packet, based on node state parameters of nodes in the network cluster, link state parameters of links in the network cluster, and the traffic type of the network data stream when the data packet is received; and a transmission module, configured for transmitting the data packet via the target transmission path.

In an embodiment, the determination module is further configured for:

when the data packet is received, collecting the node state parameters of the nodes in the network cluster, wherein a node state parameter of a node represents idle computing resources of the node;

collecting the link state parameters of the links in the network cluster, wherein a link state parameter of a link represents idle bandwidth resources of the link;

determining transmission state parameters of the data packet based on the traffic type of the network data stream, a preset correspondence between traffic types and maximum transmission times, and a preset correspondence between the traffic types and transmission priorities; wherein the transmission state parameters include a maximum transmission time and a transmission priority of the data packet; and inputting the node state parameters, the link state parameters and the transmission state parameters into a network scheduling model to obtain the target transmission path output from the network scheduling model.

In an embodiment, the apparatus further includes:

a training module, configured for training the network scheduling model through operations including:

setting a state space for a Trust Region Policy Optimization (TRPO) algorithm:

$$S^{t_i} = \{S_N^{t_i}, S_E^{t_i}, S_P^{t_i}\} = \{C_1^{t_i}, \ldots, C_n^{t_i}, b_1^{t_i}, \ldots, b_n^{t_i}, MTT_i, TP_i\};$$

wherein $S^{t_i}$ is a network state at a time step $t_i$, and $S^{t_i}$ is composed of $S_N^{t_i}$, $S_E^{t_i}$ and $S_P^{t_i}$; and the time step $t_i$ is a time step at which the network scheduling model performs network resource scheduling for a data packet i;

wherein $S_N^{t_i}$ is the node state parameters of the nodes included in the network cluster, and $S_N^{t_i}$ includes $C_1^{t_i}, \ldots, C_P^{t_i}$, where $C_n^{t_i}$ represents an idle computing resource of a node n at the time step $t_i$;

wherein $S_E^{t_i}$ is the link state parameters of the links included in the network cluster, and $S_E^{t_i}$ includes $b_1^{t_i}, \ldots, b_n^{t_i}$, where $b_n^{t_i}$ represents an idle computing resource of a link n at the time step $t_i$; and wherein $S_P^{t_i}$ includes $MTT_i$ and $TP_i$; $MTT_i$ represents the maximum transmission time of the data packet i, and the maximum transmission time of the data packet i is a maximum transmission time corresponding to the traffic type of the network data stream to which the data packet i belongs; and $TP_i$ represents the transmission priority of the data packet i, and the transmission priority of the data packet i is a transmission priority corresponding to the traffic type of the network data stream to which the data packet i belongs;

traversing the network cluster to determine transmission paths from the ingress node to an egress node in the network cluster, and setting an action space for the TRPO algorithm based on the determined transmission paths: $A = \{a | a \in \{1, 2, \ldots, P\}\}$, wherein a represents an action selected according to the TRPO algorithm, and P represents the number of the transmission paths from the ingress node to the egress node in the network cluster;

setting a reward function for the TRPO algorithm:

$$r_t = -\sum_{i \in I_t} \frac{1}{MTT_t} - cN_t + b;$$

wherein $r_t$ is the reward function at the time step t, $I_t$ is a set of data packets transmitted over the network cluster within the time step t, $N_t$ is the number of data packets discarded within the time step t, b is a baseline value, and c is a penalty coefficient;

setting a loss function for the TRPO algorithm:

$$L(\theta) = E_t[\text{clip}(r_t(\theta), 1-\varepsilon, 1+\varepsilon)\hat{A}_t - \lambda D_{pp}(\pi_{\theta_{old}}(\cdot | s), \pi_\theta(\cdot | s))];$$

wherein $$E_t\left[\text{clip}(r_t(\theta), 1-\varepsilon, 1+\varepsilon)\hat{A}_t - \lambda D_{pp}\left(\pi_{\theta_{old}}(\cdot \mid s), \pi_\theta(\cdot \mid s)\right)\right]$$

represents a mathematical expectation of $$\text{clip}(r_t(\theta), 1-\varepsilon, 1+\varepsilon)\hat{A}_t - \lambda D_{pp}\left(\pi_{\theta_{old}}(\cdot \mid s), \pi_\theta(\cdot \mid s)\right)$$

at the time step t, θ represents a set of all parameters of a neural network for the policy in the TRPO algorithm, and $$r_t(\theta) = \frac{\pi_\theta(a_t \mid s_t)}{\pi_{\theta_{old}}(a_t \mid s_t)}$$

represents a ratio of a probability that an action is selected under a new policy πθ($a_t|s_t$) in a network state to a probability that the same action is selected under an old policy $$\pi_{\theta_{old}}(a_t \mid s_t)$$

in the same network state;

wherein the function clip( ) is a value clipping function; $1+\varepsilon(\varepsilon\in(0,1))$ in the function clip( ) is an upper bound value of $r_t(\theta)$, and $1-\varepsilon(\varepsilon\in(0,1))$ is a lower bound value of $r_t(\theta)$; if a calculated value of $r_t(\theta)$ is between the upper bound value and the lower bound value, a value of the function clip( ) is the calculated value of $r_t(\theta)$; if the calculated value of $r_t(\theta)$ is greater than the upper bound value, the value of the function clip( ) is the upper bound value; and if the calculated value of $r_t(\theta)$ is less than the lower bound value, the value of the function clip( ) is the lower bound value;

wherein $$D_{pp}\left(\pi_{\theta_{dd}}(\cdot \mid s), \pi_\theta(\cdot \mid s)\right) = \left(\pi_{\theta_{old}}(a_t \mid s_t) - \pi_\theta(a_t \mid s_t)\right)^2$$

represents a square value of a distance of a point probability distribution between the new policy πθ($a_t|s_t$) and the old policy $$\pi_{\theta_{old}}(a_t \mid s_t),$$

and λ is the penalty coefficient;

wherein $\hat{A}_t$ is an advantage function, $\hat{A}_t$ represents a difference between an action value function for selecting a specific action at the time step t and the state value function at the time step t, $$\hat{A}_t = A(s, a) = E_\pi\left[\sum_{k=0}^{\infty}\gamma^k r_{t+k} \mid S_t = s, A_t = a\right] - V_t(s);$$

wherein $$E_\pi\left[\sum_{k=0}^{\infty}\gamma^k r_{t+k} \mid S_t = s, A_t = a\right]$$

represents the action function for taking an action a under a state s according to a policy $$\pi, \sum_{k=0}^{\infty}\gamma^k r_{t+k}$$

is the predicted cumulated reward value in K time steps after taking action a at time step t, $E_\pi[\ ]$ represents to computed the expectation; $\gamma(\gamma\in(0,1))$ is a discount factor to indicating importance of future rewards relative to current rewards; $r_{t+k}$ represents the reward value at a time step t+k; $V_t(s)$ represents the weighted sum of the action value functions of all the actions in the action space under the network state s at the time step t; and training the neural network model by using network data stream, the state space, the action space, the reward function and the loss function to obtain the network scheduling model, wherein the neural network model is a neural network model based on the TRPO algorithm.

In an embodiment, the determination module is further configured for:

determining features of the network data stream based on the number of the data packets of the network data stream received within the specified period of time, the lengths of the data packets and the reception times of the data packets; and inputting the features into a preset classification model to obtain a result of classification of the network data stream from the preset classification model, wherein the preset classification model is obtained by training with a preset training set, wherein the preset training set includes network data stream and traffic types of the network data stream as labels;

wherein the features include:

within the specified period of time, a maximum value of arrival time intervals of received forward packets of the network data stream, a minimum value of the arrival time intervals of the forward packets, an average value of the arrival time intervals of the forward packets, a standard deviation of the arrival time intervals of the forward packets, a maximum value of lengths of the forward packets, a minimum value of the lengths of the forward packets, an average value of the lengths of the forward packets, and a standard deviation of the lengths of the forward packets;

within the specified period of time, a maximum value of arrival time intervals of received backward packets of the network data stream, a minimum value of the arrival time intervals of the backward packets, an average value of the arrival time intervals of the backward packets, a standard deviation of the arrival time intervals of the backward packets, a maximum value of lengths of the backward packets, a minimum value of the lengths of the backward packets, an average value of the lengths of the backward packets, and a standard deviation of the lengths of the backward packets;

within the specified period of time, a maximum value of arrival time intervals of received bidirectional packets of the network data stream, a minimum value of the arrival time intervals of the bidirectional packets, an average value of the arrival time intervals of the bidirectional packets, a standard deviation of the arrival time intervals of the bidirectional packets, a maximum value of lengths of the bidirectional packets, a minimum value of the lengths of the bidirectional packets, an average value of the lengths of the bidirectional packets, and a standard deviation of the lengths of the bidirectional packets;

duration of the network data stream within the specified period of time, wherein the duration of the network data stream refers to a difference between a reception time of a first data packet and a reception time of a last data packet within the specified period of time; and within the specified period of time, the number of the received forward packets of the network data stream per second, the number of bytes of the forward packets per second, the number of the received backward packets of the network data stream per second, the number of bytes of the backward packets per second, a ratio of the number of the forward packets per second to the number of the backward packets per second, and a ratio of the number of the bytes of the forward packets per second to the number of the bytes of the backward packets per second.

In an embodiment, the determination module is further configured for: re-determining, every specified time interval, the traffic type of the network data stream based on the number of data packets of the network data stream received within the specified period of time, the lengths of the data packets and the reception times of the data packets.

In a third aspect, an embodiment of the present application provides an electronic device, including:

a processor, a communication interface, a memory and a communication bus; wherein the processor, the communication interface and the memory communicate with each other via the communication bus;

the memory is configured for storing a computer program; and the processor is configured for, by executing the computer program stored on the memory, implementing the network resource scheduling method provided by the embodiments of the present application.

In a fourth aspect, an embodiment of the present application provides a non-transitory computer readable storage medium having stored thereon a computer program that, when executed by a processor, cause the processor to carry out the network resource scheduling method provided by the embodiments of the present application.

In a fifth aspect, an embodiment of the present application provides a computer program product including instructions. The computer program product including the instructions, when executed on a computer, causes the computer to perform the network resource scheduling method provided by the embodiments of the present application.

The advantages of the embodiments of the present application include the following aspects.

In the solutions described herein, when a network data stream is received, the traffic type of the network data stream can be determined based on the number of, the lengths of and the reception times of data packets of the network data stream received within a specified period of time. Thus, no matter whether the network data stream is transmitted in an encrypted manner or not, the traffic type of the network data stream can be determined. Further, for each received data packet included in the network data stream, a target transmission path for the data packet can be determined based on the node state parameters of the nodes in the network cluster, the link state parameters of the links in the network cluster, and the traffic type of the network data stream. The data packet is then transmitted via the target transmission path. It can be seen that the embodiment of the present application also combines the traffic type of the network data stream when determining the transmission path for the data packet, so that the selected target transmission path meets the transmission requirements of the traffic type, improving the network service performance.

Of course, embodiments of the products or methods are not necessarily required to achieve all of the advantages described above at the same time.

BRIEF DESCRIPTION OF THE DRAWINGS

To provide a thorough understanding of the technical solutions of embodiments of the present application, a brief description is given to the accompanying drawings used herein. The accompanying drawings described below are merely for some embodiments of the present application. Other drawings may be obtained by those skilled of the art based on the accompanying drawings herein without creative efforts.

DETAILED DESCRIPTION

Figure 1:
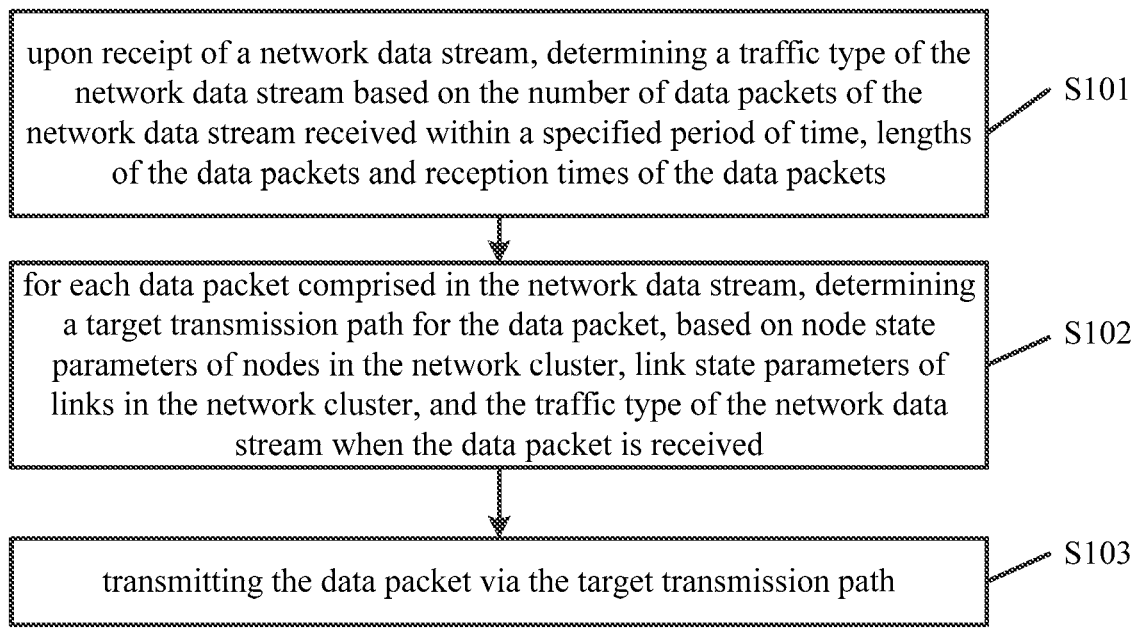
FIG. 1 is a flowchart of a network resource scheduling method provided by an embodiment of the present application.

Details of the technical solutions in the embodiments of the present application will be given below with reference to the accompanying drawings for the embodiments of the present application. The embodiments described herein are merely a part of and not all of the embodiments of the present application. All other embodiments obtained by those skilled in the art based on the embodiments herein without creative efforts shall fall within the scope of protection of the present application.

The network resource scheduling method provided in the embodiments of the present application is applicable to an ingress node in a network cluster. The network cluster includes multiple nodes, and there are multiple transmission paths between the ingress node and an egress node.

In an implementation, the nodes in the embodiment of the present application refer to devices such as base stations, switches, and routers.

In another implementation, the embodiment of the present application may be applied in a NFV scenario. The nodes in the embodiment of the present application refer to VNF modules that are separated from devices such as base stations, switches, and routers in the network cluster by using the NFV technologies. The transmission paths in the network cluster in the embodiment of the present application refer to paths for communication formed by the VNF modules, which include a Service Function Chain (SFC).

The SFC is constructed by a sequence of VNFs implementing the services, and has a starting VNF and an ending VNF. In an embodiment of the present application, the ingress node and the egress node in the network cluster may be nodes on which deployed on the starting VNF and the ending VNF of the SFC, or may be nodes where no starting VNF and ending VNF are deployed.

For example, an SFC is composed of VNF1, VNF2, VNF3, and VNF4, which are deployed on a Node 1, a Node 2, a Node 3 and a Node 4. VNF1 is the starting VNF of the SFC, and VNF4 is the ending VNF of the SFC. However, the ingress node of the network cluster may be a Node 5 and the egress node may be a Node 6.

A transmission path between the ingress node and the egress node in the network cluster may include nodes where all VNFs of the SFC are deployed. For example, the transmission path may include the Node 5, the Node 1, the Node 2, the Node 3, the Node 4 and the Node 6.

Optionally, the network cluster may be a content distribution network. For example, a video server can transmit a video stream to a terminal over the network cluster. When receiving the video stream, the ingress node of the network cluster determines a transmission path by resource scheduling, and then transmits the video stream to the terminal via the determined transmission path.

In the case where the network cluster is a content distribution network, the ingress node of the network cluster is a device connected to the server, and the egress node is a device connected to a client.

In the embodiment of the present application, a data packet transmitted from the client to the server is referred to as a forward packet, a data packet transmitted from the server to the client is referred to as a backward packet, and the data packet transmitted between the client and the server is referred to as a bidirectional packet. The bidirectional packet includes a forward packet and a backward packet.

An embodiment of the network resource scheduling method is provided. The method is applicable to an ingress node in a network cluster. As shown in FIG. 1, the method includes the following steps Step S101, upon receipt of a network data stream, determining a traffic type of the network data stream based on the number of data packets of the network data stream received within a specified period of time, lengths of the data packets and reception times of the data packets.

This step may include determining features of the network data stream based on the number of the data packets of the network data stream received within the specified period of time, the lengths of the data packets and the reception times of the data packets; and inputting the features into a preset classification model to obtain a result of classification of the network data stream from the preset classification model.

The preset classification model is obtained by training with a preset training set. The preset training set includes network data stream samples and traffic types of the network data stream samples as labels.

In an embodiment of the present application, the preset classification model is a deep forest model. Experiments indicate that the deep forest model may produce a classification result with an accuracy of up to 92%.

By way of example, the specified period of time may be 5 seconds. The features of the network data stream can be determined based on the data packets of the network data stream received within 5 seconds from the receipt of the network data stream. The traffic type of the network data stream can be determined based on the features.

After the traffic type is determined based on the data packets of the network data stream received within 5 seconds, a correspondence between the identifier of the network data stream and the traffic type of the network data stream may be recorded. At this point, a determination of the traffic type of each data packet in the network data stream is not required, and the traffic type of subsequently received data packets of the network data stream is considered to be the traffic type corresponding to the identifier of the network data stream.

For a network data stream with a long duration, the traffic type of the network data stream may change. Therefore, the ingress node may re-determine, every specified time interval, the traffic type of the network data stream based on the number of data packets of the network data stream received within the specified period of time, the lengths of the data packets and the reception times of the data packets.

For example, for a network data stream A, the traffic type of the network data stream A is determined as Traffic type 1 based on data packets of the network data stream A received from the 0th second to the 5th second.

After 30 seconds, the traffic type of the network data stream A may be determined again based on data packets of the network data stream A received from the 35th to the 40th seconds. If the traffic type determined at this time is Traffic type 2, the traffic type of the network data stream A will be updated with the Traffic type 2.

In an embodiment of the present application, network data streams may be divided into data streams of eight traffic types according to user behavior features and quality of service requirements, and the data streams of the eight traffic types are: web browsing data, instant messaging data, audio stream, video stream, email, voice over Internet, Peer-to-Peer (P2P) transmission data, and File Transfer Protocol (FTP) data. These eight traffic types cover most traffic types in a network. Of course, the traffic types in the embodiment of the present application are not limited to these eight types, and other traffic types are also possible.

Step S102, for each data packet included in the network data stream, determining a target transmission path for the data packet, based on node state parameters of nodes in the network cluster, link state parameters of links in the network cluster, and the traffic type of the network data stream when the data packet is received.

Step S103, transmitting the data packet via the target transmission path.

In the network resource scheduling method provided in the embodiment of the present application, when a network data stream is received, the traffic type of the network data stream can be determined based on the number of, the lengths of and the reception times of data packets of the network data stream received within a specified period of time. Thus, no matter whether the network data stream is transmitted in an encrypted manner or not, the traffic type of the network data stream can be determined. Further, for each received data packet included in the network data stream, a target transmission path for the data packet can be determined based on the node state parameters of the nodes in the network cluster, the link state parameters of the links in the network cluster, and the traffic type of the network data stream. The data packet is then transmitted via the target transmission path. It can be seen that the embodiment of the present application also combines the traffic type of the network data stream when determining the transmission path for the data packet, so that the selected target transmission path meets the transmission requirements of the traffic type, improving the network service performance.

In an embodiment of the present application, the features described above include the following features A~E.

A: within the specified period of time, a maximum value of arrival time intervals of received forward packets of the network data stream, a minimum value of the arrival time intervals of the forward packets, an average value of the arrival time intervals of the forward packets, a standard deviation of the arrival time intervals of the forward packets, a maximum value of lengths of the forward packets, a minimum value of the lengths of the forward packets, an average value of the lengths of the forward packets, and a standard deviation of the lengths of the forward packets. The arrival time interval of forward packets refers to the interval of time between arrival times of two adjacent forward packets.

B: within the specified period of time, a maximum value of arrival time intervals of received backward packets of the network data stream, a minimum value of the arrival time intervals of the backward packets, an average value of the arrival time intervals of the backward packets, a standard deviation of the arrival time intervals of the backward packets, a maximum value of lengths of the backward packets, a minimum value of the lengths of the backward packets, an average value of the lengths of the backward packets, and a standard deviation of the lengths of the backward packets. The arrival time interval of the backward packets refers to the interval of time between arrival times of two adjacent backward packets.

C: within the specified period of time, a maximum value of arrival time intervals of received bidirectional packets of the network data stream, a minimum value of the arrival time intervals of the bidirectional packets, an average value of the arrival time intervals of the bidirectional packets, a standard deviation of the arrival time intervals of the bidirectional packets, a maximum value of lengths of the bidirectional packets, a minimum value of the lengths of the bidirectional packets, an average value of the lengths of the bidirectional packets, and a standard deviation of the lengths of the bidirectional packets. The arrival time interval of the bidirectional packets refers to the interval of time between arrival times of two adjacent data packets.

D: duration of the network data stream within the specified period of time, wherein the duration of the network data stream refers to a difference between a reception time of a first data packet and a reception time of a last data packet within the specified period of time. For example, if 20 data packets of the network data stream are received within 5 seconds, the reception time of the first data packet is 0 second, and the reception time of the 20th data packet is the 4.5th second, then the duration of the network data stream is 4.5 seconds.

E: within the specified period of time, the number of the received forward packets of the network data stream per second, the number of bytes of the forward packets per second, the number of the received backward packets of the network data stream per second, the number of bytes of the backward packets per second, a ratio of the number of the forward packets per second to the number of the backward packets per second, and a ratio of the number of the bytes of the forward packets per second to the number of the bytes of the backward packets per second.

The number of the forward packets per second is the number of the forward packets of the network data stream that are received per second. The number of the backward packets per second is the number of the backward packets of the network data stream that are received per second.

The number of the bytes of the forward packets per second is the number of the bytes of the forward packets of the network data stream that are received per second. The number of the bytes of the backward packets per second is: the number of the bytes of the backward packets of the network data stream that are received per second.

Figure 2:
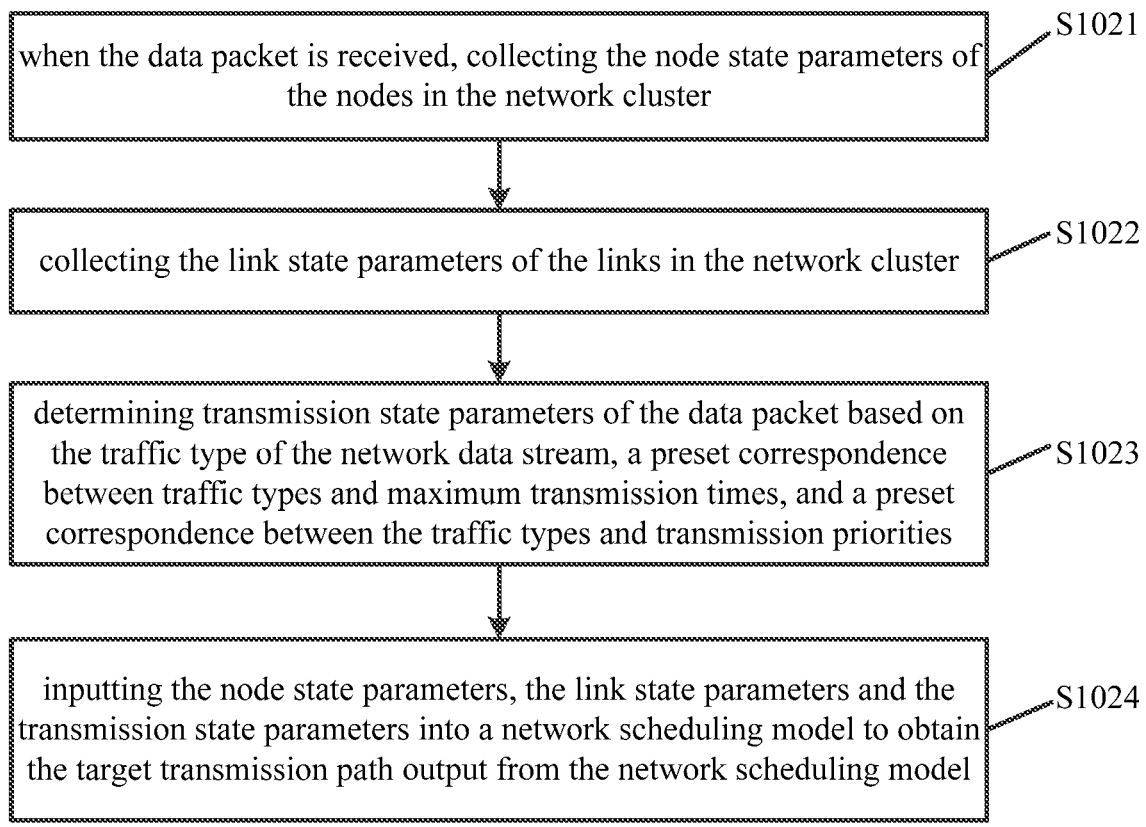
FIG. 2 is a flowchart of a process for determining a target transmission path in a network resource scheduling method provided by an embodiment of the present application.

In an embodiment of the present application, as shown in FIG. 2, the step S102, for each data packet included in the network data stream, determining a target transmission path for the data packet, based on node state parameters of nodes in the network cluster, link state parameters of links in the network cluster, and the traffic type of the network data stream when the data packet is received, includes the following steps.

Step S1021, when the data packet is received, collecting the node state parameters of the nodes in the network cluster.

A node state parameter of a node represents an idle computing resource of the node.

Step S1022, collecting the link state parameters of the links in the network cluster.

A link state parameter of a link represents an idle bandwidth resource of the link.

Step S1023, determining transmission state parameters of the data packet based on the traffic type of the network data stream, a preset correspondence between traffic types and maximum transmission times, and a preset correspondence between the traffic types and transmission priorities.

The transmission state parameters include a maximum transmission time and a transmission priority of the data packet.

In the embodiment of the present application, the correspondence between the traffic types and the maximum transmission times and the correspondence between the traffic types and the transmission priorities are preset. After the traffic type is determined, the maximum transmission time and transmission priority of each data packet included in the network data stream can be determined based on the above correspondences.

Steps S1021-S023 may be performed in parallel or in a certain order, which is not limit herein. FIG. 2 shows an example of the order in which of steps S1021-S1023 are performed one after another Step S1024, inputting the node state parameters, the link state parameters and the transmission state parameters into a network scheduling model to obtain the target transmission path output from the network scheduling model.

The network scheduling model is obtained through the following steps.

Step 1, setting a state space for a Trust Region Policy Optimization (TRPO) algorithm:

$$S^{t_i} = \{S_N^{t_i}, S_E^{t_i}, S_P^{t_i}\} = \{C_1^{t_i}, \ldots, C_n^{t_i}, b_1^{t_i}, \ldots, b_n^{t_i}, MT\text{-}T_i, TP_i\};$$

where $S^{t_i}$ is a network state at a time step $t_i$; and $S^{t_i}$ is composed of $S_N^{t_i}$, $S_E^{t_i}$ and $S_P^{t_i}$; and the time step $t_i$ is a time step at which the network scheduling model performs network resource scheduling for a data packet i;

where $S_N^{t_i}$ is the node state parameters of the nodes in the network cluster, and $S_N^{t_i}$ includes $C_1^{t_i}, \ldots, C_n^{t_i}$, where $C_n^{t_i}$ represents an idle computing resource of anode n at the time step $t_i$;

where $S_E^{t_i}$ is the link state parameters of the links in the network cluster, and $S_E^{t_i}$ includes $b_1^{t_i}, \ldots b_n^{t_i}$, where $b_n^{t_i}$ represents an idle bandwidth resource of a link n at the time step $t_i$;

where $S_P^{t_i}$ includes $MTT_i$ and $TP_i$; $MTT_i$ represents the maximum transmission time of the data packet i, and the maximum transmission time of the data packet i is a maximum transmission time corresponding to the traffic type of the network data stream to which the data packet i belongs; and $TP_i$ represents the transmission priority of the data packet i, and the transmission priority of the data packet i is a transmission priority corresponding to the traffic type of the network data stream to which the data packet i belongs.

Step 2, traversing the network cluster to determine transmission paths from the ingress node to an egress node in the network cluster, and setting an action space for the TRPO algorithm based on the determined transmission paths: A={a|a∈{1, 2, . . . , P}}.

Where a represents an action selected according to the TRPO algorithm, and P represents the number of the transmission paths from the ingress node to the egress node in the network cluster.

In the scenario of the embodiment of the present application, the actions selected according to the TRPO algorithm are the transmission paths selected for a data packet; and {1, 2, . . . , P} includes serial numbers of the transmission paths in the network cluster.

In the NFV scenario, the transmission paths from the ingress node to the egress node in the network cluster must conform to a preset service function chain. That is, not all reachable paths from the ingress node to the egress node are added into the action space. Instead, the network cluster is traversed to select, from all reachable paths from the ingress node to the egress node in the network cluster, the transmission paths including the preset service function chain, and the selected transmission paths are added into the action space.

On this basis, the transmission paths selected through the above TRPO algorithm for the network data stream are transmission paths that conform to the traffic type of the network data stream. In other words, the selected transmission paths include a service function chain corresponding to the traffic type of the network data stream.

Step 3, setting a reward function for the TRPO algorithm:

$$r_t = -\sum_{i \in I_t} \frac{1}{MTT_i} - cN_t + b.$$

where $r_t$ is the reward function at the time step t, $I_t$ is a set of network data packets transmitted over the network cluster within the time step t, $N_t$ is the number of data packets discarded within the time step t, b is a baseline value, and c is a penalty coefficient.

The transmission of a network data stream is limited by the quality of service. Thus, when the transmission time of a data packet of the network data stream in the network exceeds the maximum transmission time, the data packet will be discarded. Therefore, in an embodiment of the present application, the reward function is set for the purpose of minimizing the average delay of data packets and minimizing the number of the discarded packets.

Step 4, setting a loss function for the TRPO algorithm:

$$L(\theta) = E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))].$$

where $$E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))]$$

represents a mathematical expectation of $$\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))$$

at the time step t, θ represents a set of all parameters of a neural network of the policy in the TRPO algorithm, and $$r_t(\theta) = \frac{\pi_\theta(a_t \mid s_t)}{\pi_{\theta_{old}}(a_t \mid s_t)}$$

represents a ratio of a probability that an action is selected under a new policy in a network state to a probability that the same action is selected under an old policy in the same network state.

For example, in a network state $S_1$, the probability that $a_1$ action at is selected under the new policy is Probability 1, and the probability that the action $a_1$ is selected under the old policy is Probability 2. The $r_t(\theta)$ is the ratio of the Probability 1 to the Probability 2.

The function clip( ) is a value clipping function; 1+ε(ε∈ (0,1)) in the function clip( ) is an upper bound value of $r_t(\theta)$, and 1−ε(ε∈(0,1)) is a lower bound value of $r_t(\theta)$.

If the calculated value of $r_t(\theta)$ is between the upper bound value and the lower bound value, the value of the function clip( ) is the calculated value of $r_t(\theta)$; if the calculated value of $r_t(\theta)$ is greater than the upper bound value, the value of the function clip( ) is the upper bound value; and if the calculated value of $r_t(\theta)$ is less than the lower bound value, the value of the function clip( ) is the lower bound value.

$$D_{pp}(\pi_{\theta_{old}}(\cdot \mid s), \pi_\theta(\cdot \mid s)) = (\pi_{\theta_{old}}(a_t \mid s_t) - \pi_\theta(a_t \mid s_t))^2$$

represents the square value of a distance of a point probability distribution between the new policy $\pi_\theta(a_t|s_t)$ and the old policy $$\pi_{\theta_{old}}(a_t \mid s_t),$$

and λ is the penalty coefficient.

$\hat{A}_t$ is an advantage function, and $\hat{A}_t$ represents a difference between an action value function for selecting a specific action at the time step t and a state value function at the time step t, $$\hat{A}_t = A(s, a) = E_\pi\left[\sum_{k=0}^{\infty} \gamma^t r_{t+k} \,\middle|\, S_t = s, A_t = a\right] - V_t(s);$$

where $$E_\pi\left[\sum_{k=0}^{\infty} \gamma^t r_{t+k} \,\middle|\, S_t = s, A_t = a\right]$$

represents the action function for taking an action a under a state s according to the policy $$\pi, \sum_{k=0}^{\infty} \gamma^j r_{t+k}$$

is the predicted cumulated reward value in K time steps after taking action a at time step t, $E_\pi[\ ]$ is used to compute the expectation; $\gamma(\gamma \in (0,1))$ is a discount factor indicating the importance of future rewards relative to current rewards; $r_{t+k}$ represents the reward value at the time step t+k; and $V_t(s)$ represents the weighted sum of action value functions of all the actions in the action space under the network state s at the time step t.

For each action, the weight for the action may be the probability that the action is selected in the network state s.

For example, there are 3 actions, which are Action A, Action B, and Action C. The values of the action value function for selecting Action A, Action B, and Action C in the state s are respectively Action value A, Action value B, and Action value C. If in the state s, the probability that Action A is selected is 10%, the probability that Action B is selected is 20%, and the probability that Action C is selected is 70%, then $V_t(s)$=10%*Action value A+20%*Action value B+70%*Action value C.

Step 5, training the neural network model by using the network data stream samples, the state space, the action space, the reward function and the loss function to obtain the network scheduling model.

The neural network model is a neural network model based on the TRPO algorithm.

In the training process, network data stream samples of different traffic types may be transmitted through the ingress node, and the number of network data stream samples input at a same time may be adjusted to train the neural network model under different congestion levels.

Applying the embodiment of the present application, the arrangement and scheduling mechanism of virtual network functions are combined with the network traffic classification technology. Resource scheduling based on traffic types of network data streams can provide different services for network data streams with different business requirements, for example, a network data stream of a low-latency service will be transmitted first, which can improve the network service performance.

With experiments, in the same network environment, compared with solutions in the previous works, the method proposed herein can improve the network utilization rate, reduce the network congestion and achieve a higher network throughput.

Figure 3:
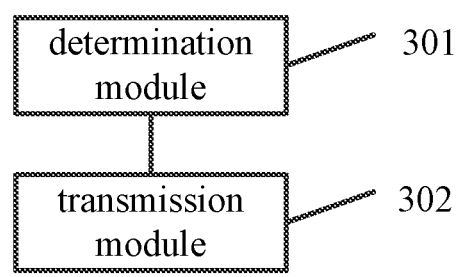
FIG. 3 is a schematic structural diagram of a network resource scheduling apparatus provided by an embodiment of the present application.

Based on the same technical concept, an embodiment of a network resource scheduling apparatus is also provided. The apparatus is applicable to an ingress node in a network cluster. As shown in FIG. 3, the apparatus includes:

a determination module 301 configured for upon receipt of a network data stream, determining a traffic type of the network data stream based on the number of data packets of the network data stream received within a specified period of time, lengths of the data packets and reception times of the data packets; and for each data packet included in the network data stream, determining a target transmission path for the data packet, based on node state parameters of nodes in the network cluster, link state parameters of links in the network cluster, and the traffic type of the network data stream when the data packet is received; and a transmission module 302 configured for transmitting the data packet via the target transmission path.

Optionally, the determination module 301 is further configured for:

when the data packet is received, collecting the node state parameters of the nodes in the network cluster, wherein a node state parameter of a node represents idle computing resources of the node;

collecting the link state parameters of the links in the network cluster, wherein a link state parameter of a link represents idle bandwidth resources of the link;

determining transmission state parameters of the data packet based on the traffic type of the network data stream, a preset correspondence between traffic types and maximum transmission times, and a preset correspondence between the traffic types and transmission priorities; wherein the transmission state parameters include a maximum transmission time and a transmission priority of the data packet; and inputting the node state parameters, the link state parameters and the transmission state parameters into a network scheduling model to obtain the target transmission path output from the network scheduling model.

Optionally, the apparatus further includes:

a training module configured for training the network scheduling model through operations including:

setting a state space for a TRPO algorithm:

$$S^{t_i} = \{S_N^{t_i}, S_E^{t_i}, S_P^{t_i}\} = \{C_1^{t_i}, \ldots, C_n^{t_i}, b_1^{t_i}, \ldots, b_n^{t_i}, MTT_i, TP_i\};$$

wherein $S^{t_i}$ is a network state at a time step $t_i$, and $S^{t_i}$ is composed of $S_N^{t_i}$, $S_E^{t_i}$ and $S_P^{t_i}$; and the time step $t_i$ is a time step at which the network scheduling model performs network resource scheduling for a data packet i;

wherein $S_N^{t_i}$ is the node state parameters of the nodes in the network cluster, and $S_N^{t_i}$ includes $C_1^{t_i}, \ldots, C_n^{t_i}$, where $C_n^{t_i}$ represents an idle computing resource of a node n at the time step $t_i$;

wherein $S_E^{t_i}$ is the link state parameters of the links in the network cluster, and $S_E^{t_i}$ includes $b_1^{t_i}, \ldots, b_n^{t_i}$, where $b_n^{t_i}$ represents an idle bandwidth resource of a link n at the time step $t_i$; and wherein $S_P^{t_i}$ includes $MTT_i$ and $TP_i$; $MTT_i$ represents a maximum transmission time of the data packet i, and the maximum transmission time of the data packet i is a maximum transmission time corresponding to the traffic type of the network data stream to which the data packet i belongs; and $TP_i$ represents a transmission priority of the data packet i, and the transmission priority of the data packet i is a transmission priority corresponding to the traffic type of the network data stream to which the data packet i belongs;

traversing the network cluster to determine transmission paths from the ingress node to an egress node in the network cluster, and setting an action space for the TRPO algorithm based on the determined transmission paths: A={a|a∈ {1, 2, . . . , P}}, wherein a represents an action selected according to the TRPO algorithm, and P represents the number of the transmission paths from the ingress node to the egress node in the network cluster;

setting a reward function for the TRPO algorithm:

$$r_t = -\sum_{i \in I_t} \frac{1}{MTT_i} - cN_t + b;$$

wherein $r_t$ is the reward function at the time step t, $I_t$ is a set of data packets transmitted over the network cluster within the time step t, $N_t$ is the number of data packets discarded within the time step t, b is a baseline value, and c is a penalty coefficient;

setting a loss function for the TRPO algorithm:

$$L(\theta) = E_t[\text{clip}(r_t(\theta), 1-\varepsilon, 1+\varepsilon)\hat{A}_t - \lambda D_{pp}(\pi_{\theta_{old}}(\cdot \mid S), \pi_\theta(\cdot \mid S))];$$

wherein $$E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))]$$

represents a mathematical expectation of $$\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))$$

at the time step t, $\theta$ represents a set of all parameters of a neural network for a policy in the TRPO algorithm, and $$r_t(\theta) = \frac{\pi_\theta(a_t \mid s_t)}{\pi_{\theta_{old}}(a_t \mid s_t)}$$

represents a ratio of a probability that an action is selected under a new policy in a network state to a probability that the same action is selected under an old policy in the same network state;

wherein the function clip( ) is a value clipping function; $1+\varepsilon(\varepsilon\in(0,1))$ in the function clip( ) is an upper bound value of $r_t(\theta)$, and $1-\varepsilon(\varepsilon\in(0,1))$ is a lower bound value of $r_t(\theta)$; if a calculated value of $r_t(\theta)$ is between the upper bound value and the lower bound value, a value of the function clip( ) is the calculated value of $r_t(\theta)$; if the calculated value of $r_t(\theta)$ is greater than the upper bound value, the value of the function clip( ) is the upper bound value; and if the calculated value of $r_t(\theta)$ is less than the lower bound value, the value of the function clip( ) is the lower bound value;

wherein $$D_{pp}(\pi_{\theta_{old}}(\cdot \mid s), \pi_\theta(\cdot \mid s)) = (\pi_{\theta_{old}}(a_t \mid s_t) - \pi_\theta(a_t \mid s_t))^2$$

represents a square value of a distance of a point probability distribution between the new policy $\pi_\theta(a_t \mid s_t)$ and the old policy $$\pi_{\theta_{old}}(a_t \mid s_t),$$

and $\lambda$ is a penalty coefficient;

wherein $\hat{A}_t$ is an advantage function, $\hat{A}_t$ represents a difference between an action value function for selecting a specific action at the time step t and a state value function at the time step t, $$\hat{A}_t = A(s,a) = E_\pi\left[\sum_{k=0}^{\infty}\gamma^k r_{t+k} \,\Big|\, S_t = s, A_t = a\right] - V_t(s);$$

wherein $$E_\pi\left[\sum_{k=0}^{\infty}\gamma^k r_{t+k} \,\Big|\, S_t = s, A_t = a\right];$$

represents the action function for taking an action a under a state s according to a policy $$\pi, \sum_{k=0}^{\infty}\gamma^k r_{t+k}$$

is a predicted cumulated reward value in K time steps after taking the action a at the time step t, $E_\pi[\ ]$ is used to compute an expectation; $\gamma(\gamma\in(0,1))$ is a discount factor indicating importance of future rewards relative to current rewards; $r_{t+k}$ represents a reward value at a time step t+k; $V_t(s)$ represents a weighted sum of action value functions of all actions in the action space under the network state s at the time step t; and training the neural network model by using network data stream samples, the state space, the action space, the reward function and the loss function to obtain the network scheduling model, wherein the neural network model is a neural network model based on the TRPO algorithm.

Optionally, the determination module 301 is specifically configured for:

determining features of the network data stream based on the number of the data packets of the network data stream received within the specified period of time, the lengths of the data packets and the reception times of the data packets; and inputting the features into a preset classification model to obtain a result of classification of the network data stream from the preset classification model, wherein the preset classification model is obtained by training with a preset training set, wherein the preset training set includes network data stream samples and traffic types of the network data stream samples;

wherein the features include:

within the specified period of time, a maximum value of arrival time intervals of received forward packets of the network data stream, a minimum value of the arrival time intervals of the forward packets, an average value of the arrival time intervals of the forward packets, a standard deviation of the arrival time intervals of the forward packets, a maximum value of lengths of the forward packets, a minimum value of the lengths of the forward packets, an average value of the lengths of the forward packets, and a standard deviation of the lengths of the forward packets;

within the specified period of time, a maximum value of arrival time intervals of received backward packets of the network data stream, a minimum value of the arrival time intervals of the backward packets, an average value of the arrival time intervals of the backward packets, a standard deviation of the arrival time intervals of the backward packets, a maximum value of lengths of the backward packets, a minimum value of the lengths of the backward packets, an average value of the lengths of the backward packets, and a standard deviation of the lengths of the backward packets;

within the specified period of time, a maximum value of arrival time intervals of received bidirectional packets of the network data stream, a minimum value of the arrival time intervals of the bidirectional packets, an average value of the arrival time intervals of the bidirectional packets, a standard deviation of the arrival time intervals of the bidirectional packets, a maximum value of lengths of the bidirectional packets, a minimum value of the lengths of the bidirectional packets, an average value of the lengths of the bidirectional packets, and a standard deviation of the lengths of the bidirectional packets;

duration of the network data stream within the specified period of time, wherein the duration of the network data stream refers to a difference between a reception time of a first data packet and a reception time of a last data packet within the specified period of time; and within the specified period of time, the number of the received forward packets of the network data stream per second, the number of bytes of the forward packets per second, the number of the received backward packets of the network data stream per second, the number of bytes of the backward packets per second, a ratio of the number of the forward packets per second to the number of the backward packets per second, and a ratio of the number of the bytes of the forward packets per second to the number of the bytes of the backward packets per second.

Optionally, the determination module 301 is further configured for re-determining, every specified time interval, the traffic type of the network data stream based on the number of data packets of the network data stream received within the specified period of time, the lengths of the data packets and the reception times of the data packets.

Figure 4:
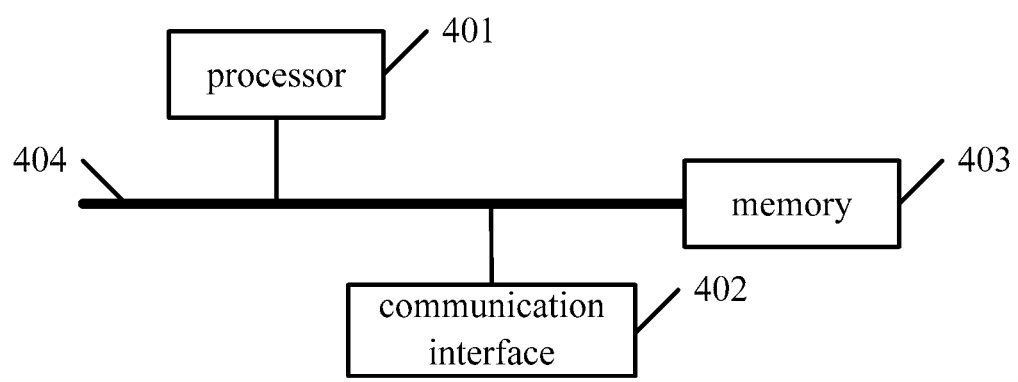
FIG. 4 is a schematic structural diagram of an electronic device provided by an embodiment of the present application.

An embodiment of the present application further provides an electronic device, as shown in FIG. 4, including a processor 401, a communication interface 402, a memory 403 and a communication bus 404; wherein the processor 401, the communication interface 402 and the memory 403 communicate with each other via the communication bus 404;

the memory 403 is configured for storing a computer program; and the processor 401 is configured for, by executing the computer program stored on the memory 403, implementing the steps of embodiments of the method.

The communication bus in the electronic device can be a Peripheral Component Interconnect (PCI) bus or an Extended Industry Standard Architecture (EISA) bus, and the like. This communication bus may include an address bus, a data bus, a control bus, or the like. For ease of representation, only one thick line is shown in the figure, which does not imply that there is only one communication bus or one type of communication bus.

The communication interface is configured for communication between the electronic advice and other devices.

The memory may include a Random Access Memory (RAM), or may include a Non-Volatile Memory (NVM), for example at least one disk memory. Optionally, the memory may also be at least one storage located away from the processor.

The processor may be a general-purpose processor, such as a Central Processing Unit (CPU), a Network Processor (NP), or the like; the processor may also be a Digital Signal Processor (DSP), an Application Specific Integrated Circuit (ASIC), a Field-Programmable Gate Array (FPGA) or other programmable logic device, a discrete gate or transistor logic device, a discrete hardware component.

Another embodiment of the present application further provides a non-transitory computer readable storage medium having stored thereon a computer program that, when executed by a processor, causes the processor to carry out any of the network resource scheduling methods.

Another embodiment of the present application also provides a computer program product including instructions that, when executed on a computer, cause the computer to perform the network resource scheduling method of any of the above embodiments.

The embodiments may be implemented in whole or in part as software, hardware, firmware, or any combination thereof. When implemented as software, the embodiments may be implemented in whole or in part in the form of a computer program product. The computer program product includes one or more computer instructions. When the computer program instructions are loaded and executed on a computer, the processes or functions according to embodiments of the present application are generated in whole or in part. The computer may be a general purpose computer, a special purpose computer, a computer network, or other programmable devices. The computer instructions may be stored on a computer readable storage medium or transmitted from one computer readable storage medium to another computer readable storage medium. For example, the computer instructions may be transmitted through wired connection (e.g., coaxial-cable, fiber, digital subscriber line (DSL)) or wirelessly (by e.g., infrared, wireless, microwave, etc.) from a node of a website, a computer, a server or a data center to a node of another website, a computer, a server or data center. The computer readable storage medium may be any available medium that is accessible by a computer, or may be a data storage device, such as a server, data center, or the like, including one or more integrated available mediums. The available mediums may be magnetic medium (e.g., a floppy disk, hard disk, or magnetic tape), optical medium (e.g., a DVD), or semiconductor medium (e.g., a Solid State Disk (SSD)), etc.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and description of a component in an embodiment may apply to another containing the same. The description for each embodiment focuses on the differences from other embodiments. In particular, a brief description is provided to embodiments of apparatuses and devices in view of their resemblance with the method embodiments. Relevant details can be known with reference to the description of the method embodiments.

The embodiments described above are only preferable embodiments of the present application, and are not intended to limit the scope of protection of the present application. Any modification, equivalent, and improvement within the spirit and principle of the present application are all within the scope of protection of the present application.

The invention claimed is:

1. A network resource scheduling method, applicable to an ingress node in a network cluster, comprising:

upon receipt of a network data stream, determining a traffic type of the network data stream based on a number of data packets of the network data stream received within a specified period of time, lengths of the data packets and reception times of the data packets;

for each data packet comprised in the network data stream, determining a target transmission path for the data packet, based on node state parameters of nodes in the network cluster, link state parameters of links in the network cluster, and the traffic type of the network data stream when the data packet is received; and transmitting the data packet via the target transmission path, wherein the determining of a traffic type of the network data stream comprises:

determining features of the network data stream based on the number of the data packets of the network data stream received within the specified period of time, the lengths of the data packets and the reception times of the data packets; and inputting the features into a preset classification model to obtain a result of classification of the network data stream from the preset classification model, wherein the preset classification model is obtained by training with a preset training set, wherein the preset training set comprises network data stream samples and traffic types of the network data stream samples;

wherein the features comprise:

within the specified period of time, a maximum value of arrival time intervals of received forward packets of the network data stream, a minimum value of the arrival time intervals of the forward packets, an average value of the arrival time intervals of the forward packets, a standard deviation of the arrival time intervals of the forward packets, a maximum value of lengths of the forward packets, a minimum value of the lengths of the forward packets, an average value of the lengths of the forward packets, and a standard deviation of the lengths of the forward packets;

within the specified period of time, a maximum value of arrival time intervals of received backward packets of the network data stream, a minimum value of the arrival time intervals of the backward packets, an average value of the arrival time intervals of the backward packets, a standard deviation of the arrival time intervals of the backward packets, a maximum value of lengths of the backward packets, a minimum value of the lengths of the backward packets, an average value of the lengths of the backward packets, and a standard deviation of the lengths of the backward packets;

within the specified period of time, a maximum value of arrival time intervals of received bidirectional packets of the network data stream, a minimum value of the arrival time intervals of the bidirectional packets, an average value of the arrival time intervals of the bidirectional packets, a standard deviation of the arrival time intervals of the bidirectional packets, a maximum value of lengths of the bidirectional packets, a minimum value of the lengths of the bidirectional packets, an average value of the lengths of the bidirectional packets, and a standard deviation of the lengths of the bidirectional packets;

duration of the network data stream within the specified period of time, wherein the duration of the network data stream refers to a difference between a reception time of a first data packet and a reception time of a last data packet within the specified period of time; and within the specified period of time, the number of the received forward packets of the network data stream per second, the number of bytes of the forward packets per second, the number of the received backward packets of the network data stream per second, the number of bytes of the backward packets per second, a ratio of the number of the forward packets per second to the number of the backward packets per second, and a ratio of the number of the bytes of the forward packets per second to the number of the bytes of the backward packets per second.

2. The method of claim 1, wherein the determining of a target transmission path for the data packet comprises:

when the data packet is received, collecting the node state parameters of the nodes in the network cluster, wherein a node state parameter of a node represents an idle computing resource of the node;

collecting the link state parameters of the links in the network cluster, wherein a link state parameter of a link represents an idle bandwidth resource of the link;

determining transmission state parameters of the data packet based on the traffic type of the network data stream, a preset correspondence between traffic types and maximum transmission times, and a preset correspondence between the traffic types and transmission priorities; wherein the transmission state parameters comprise a maximum transmission time and a transmission priority of the data packet; and inputting the node state parameters, the link state parameters and the transmission state parameters into a network scheduling model to obtain the target transmission path output from the network scheduling model.

3. The method of claim 2, wherein the network scheduling model is obtained through operations comprising:

setting a state space for a Trust Region Policy Optimization (TRPO) algorithm:

$$S^{t_i} = \{S_N^{t_i}, S_E^{t_i}, S_P^{t_i}\} = \{C_1^{t_i}, \ldots, C_n^{t_i}, b_1^{t_i}, \ldots, b_n^{t_i}, MTT_i, TP_j\};$$

wherein $S^{t_i}$ is a network state at a time step $t_i$, and $S^{t_i}$ is composed of $S_N^{t_i}$, $S_E^{t_i}$ and $S_P^{t_i}$; and the time steps is a time step at which the network scheduling model performs network resource scheduling for a data packet i;

wherein $S_N^{t_i}$ is the node state parameters of the nodes in the network cluster, and $S_N^{t_i}$ comprises $C_1^{t_i}, \ldots, C_n^{t_i}$, where $C_n^{t_i}$ represents an idle computing resource of a node n at the time step $t_i$;

wherein $S_E^{t_i}$ is the link state parameters of the links in the network cluster, and $S_E^{t_i}$ comprises $b_1^{t_i}, \ldots, b_n^{t_i}$, where $b_n^{t_i}$ represents an idle bandwidth resource of a link n at the time step $t_i$; and wherein $S_P^{t_i}$ comprises and $MTT_i$ and $TP_i$; $MTT_i$ represents a maximum transmission time of the data packet i, and the maximum transmission time of the data packet i is a maximum transmission time corresponding to the traffic type of the network data stream to which the data packet i belongs; and $TP_i$ represents a transmission priority of the data packet i, and the transmission priority of the data packet i is a transmission priority corresponding to the traffic type of the network data stream to which the data packet i belongs;

traversing the network cluster to determine transmission paths from the ingress node to an egress node in the network cluster, and setting an action space for the TRPO algorithm based on the determined transmission paths: A={a|a ∈ {1,2, ..., P}} wherein a represents an action selected according to the TRPO algorithm, and P represents the number of transmission paths from the ingress node to the egress node in the network cluster;

setting a reward function for the TRPO algorithm:

$$r_t = -\sum_{i \in I_t} \frac{1}{MTT_i} - cN_t + b;$$

wherein $r_t$ is the reward function at the time step t, $I_t$ is a set of data packets transmitted over the network cluster within the time step t, $N_t$ is the number of data packets discarded within the time step t, b is a baseline value, and c is a penalty coefficient;

setting a loss function for the TRPO algorithm:

$$L(\theta) = E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))];$$

wherein $$E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))]$$

represents a mathematical expectation of $$\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))$$

at the time step t, θ represents a set of all parameters of a neural network for a policy in the TRPO algorithm, and $$r_t(\theta) = \frac{\pi_\theta(a_t \mid s_t)}{\pi_{\theta_{old}}(a_t \mid s_t)}$$

represents a ratio of a probability that an action is selected under a new policy in a network state to a probability that the same action is selected under an old policy in the same network state;

wherein the function clip ( ) is a value clipping function; 1+ε(ε∈(0,1)) in the function clip( ) is an upper bound value of $r_t(\theta)$, and 1−ε(ε∈(0,1)) is a lower bound value of $r_t(\theta)$; if a calculated value of $r_t(\theta)$ is between the upper bound value and the lower bound value, a value of the function clip( ) is the calculated value of $r_t(\theta)$; if the calculated value of $r_t(\theta)$ is greater than the upper bound value, the value of the function clip( ) is the upper bound value; and if the calculated value of $r_t(\theta)$ is less than the lower bound value, the value of the function clip( ) is the lower bound value;

wherein $$D_{pp}(\pi_{\theta_{old}}(\cdot \mid s), \pi_\theta(\cdot \mid s)) = (\pi_{\theta_{old}}(a_t \mid s_t) - \pi_\theta(a_t \mid s_t))^2$$

represents a square value of a distance of a point probability distribution between the new policy $\pi_{74}(a_t|s_t)$ and the old policy $$\pi_{\theta_{old}}(a_t \mid s_t),$$

and λ is a penalty coefficient;

wherein $\hat{A}_t$ is an advantage function, $\hat{A}_t$ represents a difference between an action value function for selecting a specific action at the time step t and a state value function at the time step t, $$\hat{A}_t = A(s, a) = E_\pi\left[\sum_{k=0}^{\infty} \gamma^t r_{t+k} \mid S_t = s, A_t = a\right] - V_t(s);$$

wherein $$E_\pi\left[\sum_{k=0}^{\infty} \gamma^t r_{t+k} \mid S_t = s, A_t = a\right]$$

represents the action value function for taking an action a under a state s according to a policy $$\pi, \sum_{k=0}^{\infty} \gamma^t r_{t+k}$$

is a predicted cumulated reward value in K time steps after taking the action a at the time step t, $E_\pi[\ ]$ is used to compute an expectation; γ(γ∈(0,1)) is a discount factor indicating importance of future rewards relative to current rewards; $r_{t+k}$ represents a reward value at a time step t+k; and $V_t(s)$ represents a weighted sum of action value functions of all actions in the action space under the network state s at the time step t; and training the neural network model by using network data stream samples, the state space, the action space, the reward function and the loss function to obtain the network scheduling model, wherein the neural network model is a neural network model based on the TRPO algorithm.

4. The method of claim 1, wherein after determining the traffic type of the network data stream, the method further comprises:

re-determining, every specified time interval, the traffic type of the network data stream based on the number of data packets of the network data stream received within the specified period of time, the lengths of the data packets and the reception times of the data packets.

5. An electronic device, comprising a processor, a communication interface, a memory and a communication bus; wherein the processor, the communication interface and the memory communicate with each other via the communication bus;

the memory is configured for storing a computer program; and the processor is configured for, by executing the computer program stored on the memory, implementing the method of claim 1.

6. A non-transitory computer readable storage medium, having stored thereon a computer program that, when executed by a processor, causes the processor to carry out the method of claim 1.

7. A network resource scheduling apparatus, applicable to an ingress node in a network cluster, comprising:
- a determination module, configured for upon receipt of a network data stream, determining a traffic type of the network data stream based on a number of data packets of the network data stream received within a specified period of time, lengths of the data packets and reception times of the data packets; and for each data packet comprised in the network data stream, determining a target transmission path for the data packet, based on node state parameters of nodes in the network cluster, link state parameters of links in the network cluster, and the traffic type of the network data stream when the data packet is received; and
- a transmission module, configured for transmitting the data packet via the target transmission path, wherein the determination module is further configured for:
- determining features of the network data stream based on the number of the data packets of the network data stream received within the specified period of time, the lengths of the data packets and the reception times of the data packets; and
- inputting the features into a preset classification model to obtain a result of classification of the network data stream from the preset classification model, wherein the preset classification model is obtained by training with a preset training set, wherein the preset training set comprises network data stream samples and traffic types of the network data stream samples;
- wherein the features comprise:
- within the specified period of time, a maximum value of arrival time intervals of received forward packets of the network data stream, a minimum value of the arrival time intervals of the forward packets, an average value of the arrival time intervals of the forward packets, a standard deviation of the arrival time intervals of the forward packets, a maximum value of lengths of the forward packets, a minimum value of the lengths of the forward packets, an average value of the lengths of the forward packets, and a standard deviation of the lengths of the forward packets;
- within the specified period of time, a maximum value of arrival time intervals of received backward packets of the network data stream, a minimum value of the arrival time intervals of the backward packets, an average value of the arrival time intervals of the backward packets, a standard deviation of the arrival time intervals of the backward packets, a maximum value of lengths of the backward packets, a minimum value of the lengths of the backward packets, an average value of the lengths of the backward packets, and a standard deviation of the lengths of the backward packets;
- within the specified period of time, a maximum value of arrival time intervals of received bidirectional packets of the network data stream, a minimum value of the arrival time intervals of the bidirectional packets, an average value of the arrival time intervals of the bidirectional packets, a standard deviation of the arrival time intervals of the bidirectional packets, a maximum value of lengths of the bidirectional packets, a minimum value of the lengths of the bidirectional packets, an average value of the lengths of the bidirectional packets, and a standard deviation of the lengths of the bidirectional packets;
- duration of the network data stream within the specified period of time, wherein the duration of the network data stream refers to a difference between a reception time of a first data packet and a reception time of a last data packet within the specified period of time; and
- within the specified period of time, the number of the received forward packets of the network data stream per second, the number of bytes of the forward packets per second, the number of the received backward packets of the network data stream per second, the number of bytes of the backward packets per second, a ratio of the number of the forward packets per second to the number of the backward packets per second, and a ratio of the number of the bytes of the forward packets per second to the number of the bytes of the backward packets per second.

8. The apparatus of claim 7, wherein the determination module is further configured for:
- when the data packet is received, collecting the node state parameters of the nodes in the network cluster, wherein a node state parameter of a node represents idle computing resources of the node;
- collecting the link state parameters of the links in the network cluster, wherein a link state parameter of a link represents idle bandwidth resources of the link;
- determining transmission state parameters of the data packet based on the traffic type of the network data stream, a preset correspondence between traffic types and maximum transmission times, and a preset correspondence between the traffic types and transmission priorities; wherein the transmission state parameters comprise a maximum transmission time and a transmission priority of the data packet; and
- inputting the node state parameters, the link state parameters and the transmission state parameters into a network scheduling model to obtain the target transmission path output from the network scheduling model.

9. The apparatus of claim 8, further comprising:
- a training module, configured for training the network scheduling model through operations comprising:
- setting a state space for a Trust Region Policy Optimization (TRPO) algorithm:

$$S^{t_i} = \{S_N^{t_i}, S_E^{t_i}, S_P^{t_i}\} = \{C_1^{t_i}, \ldots, C_n^{t_i}, b_1^{t_i}, \ldots, b_n^{t_i}, MMT_i, TP_i\};$$

- wherein $S^{t_i}$ is a network state at a time step $t_i$, and $S^{t_i}$ is composed of $S_N^{t_i}$, $S_E^{t_i}$ and $S_P^{t_i}$; and the time step $t_i$ is a time step at which the network scheduling model performs network resource scheduling for a data packet i;
- wherein $S_N^{t_i}$ is the node state parameters of the nodes in the network cluster, and $S_N^{t_i}$ comprises $C_1^{t_i}, \ldots, C_n^{t_i}$, where $C_n^{t_i}$ represents an idle computing resource of a node n at the time step $t_i$;
- wherein $S_E^{t_i}$ is the link state parameters of the links in the network cluster, and $S_E^{t_i}$ comprises $b_1^{t_i}, \ldots, b_n^{t_i}$, where $b_n^{t_i}$ represents an idle bandwidth resource of a link n at the time step $t_i$; and
- wherein $S_P^{t_i}$ comprises $MTT_i$ and $TP_i$; $MTT_i$ represents a maximum transmission time of the data packet i, and the maximum transmission time of the data packet i is a maximum transmission time corresponding to the traffic type of the network data stream to which the data packet i belongs; and $TP_i$ represents a transmission priority of the data packet i, and the transmission priority of the data packet i is a transmission priority corresponding to the traffic type of the network data stream to which the data packet i belongs;

traversing the network cluster to determine transmission paths from the ingress node to an egress node in the network cluster, and setting an action space for the TRPO algorithm based on the determined transmission paths: A={a|a ∈ {1,2, ..., P}}, wherein a represents an action selected according to the TRPO algorithm, and P represents the number of the transmission paths from the ingress node to the egress node in the network cluster;

setting a reward function for the TRPO algorithm:

$$r_t = -\sum_{i \in I_t} \frac{1}{MTT_i} - cN_t + b;$$

wherein $r_t$ is the reward function at the time step t, $I_t$ is a set of data packets transmitted over the network cluster within the time step t, $N_t$ is the number of data packets discarded within the time step t, b is a baseline value, and c is a penalty coefficient;

setting a loss function for the TRPO algorithm:

$$L(\theta) = E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))];$$

wherein $$E_t[\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))]$$

represents a mathematical expectation of $$\text{clip}(r_t(\theta), 1-\varepsilon, 1+\varepsilon)\hat{A}_t - \lambda D_{pp}(\pi_{\theta_{old}}(\cdot \mid s), \pi_\theta(\cdot \mid s))$$

at the time step t, θ represents a set of all parameters of a neural network for a policy in the TRPO algorithm, and $$r_t(\theta) = \frac{\pi_\theta(a_t \mid s_t)}{\pi_{\theta_{old}}(a_t \mid s_t)}$$

represents a ratio of a probability that an action is selected under a new policy in a network state to a probability that the same action is selected under an old policy in the same network state;

wherein the function clip ( ) is a value clipping function; 1+ε(ε∈(0,1)) in the function clip( )is an upper bound value of $r_t(\theta)$, and 1−ε(ε∈(0,1)) is a lower bound value of $r_t(\theta)$; if a calculated value of $r_t(\theta)$ is between the upper bound value and the lower bound value, a value of the function clip ( ) is the calculated value of $r_t(\theta)$; if the calculated value of $r_t(\theta)$ is greater than the upper bound value, the value of the function clip( )is the upper bound value; and if the calculated value of $r_t(\theta)$ is less than the lower bound value, the value of the function clip ( ) is the lower bound value;

wherein $$D_{pp}(\pi_{\theta_{old}}(\cdot \mid s), \pi_\theta(\cdot \mid s)) = (\pi_{\theta_{old}}(a_t \mid s_t) - \pi_\theta(a_t \mid s_t))^2$$

represents a square value of a distance of a point probability distribution between the new policy $\pi_\theta(a_t|s_t)$ and the old policy $$\pi_{\theta_{old}}(a_t \mid s_t),$$

and λ is a penalty coefficient;
wherein $\hat{A}_t$ is an advantage function, $\hat{A}_t$ represents a difference between an action value function for selecting a specific action at the time step t and a state value function at the time step t, $$\hat{A}_t = A(s, a) = E_\pi\left[\sum_{k=0}^{\infty} \gamma^k r_{t+k} \,\middle|\, S_t = s, A_t = a\right] - V_t(s);$$

wherein $$E_\pi\left[\sum_{k=0}^{\infty} \gamma^k r_{t+k} \,\middle|\, S_t = s, A_t = a\right]$$

represents the action value function for taking an action a under a state s according to a policy $$\pi, \sum_{k=0}^{\infty} \gamma^k r_{t+k}$$

is a predicted cumulated reward value in K time steps after taking the action a at the time step t, $E_\pi[]$ is used to compute an expectation; γ(γ∈(0,1)) is a discount factor indicating importance of future rewards relative to current rewards; represents a reward value at a time step t+k; and $V_t(s)$ represents a weighted sum of action value functions of all actions in the action space under the network state s at the time step t; and training the neural network model by using network data stream samples, the state space, the action space, the reward function and the loss function to obtain the network scheduling model, wherein the neural network model is a neural network model based on the TRPO algorithm.

10. The apparatus of claim 7, wherein the determination module is further configured for re-determining, every specified time interval, the traffic type of the network data stream based on the number of data packets of the network data stream received within the specified period of time, the lengths of the data packets and the reception times of the data packets.

* * * * *